United States Patent
Dominguez Romero et al.

(10) Patent No.: US 8,805,446 B2
(45) Date of Patent: Aug. 12, 2014

(54) CELL RANGE SELECTION BASED ON UE DISTANCE AND BASE STATION CAPACITY

(75) Inventors: Francisco Javier Dominguez Romero, Madrid (ES); Javier Garcia Cabezas, Madrid (ES); Maria Diaz Mateos, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 37 days.

(21) Appl. No.: 12/852,332

(22) Filed: Aug. 6, 2010

(65) Prior Publication Data

US 2011/0070874 A1 Mar. 24, 2011

(30) Foreign Application Priority Data

Aug. 7, 2009 (ES) .................................. 200930580

(51) Int. Cl.
*H04W 16/24* (2009.01)

(52) U.S. Cl.
USPC .......................................... 455/561; 455/446

(58) Field of Classification Search
CPC ..... H04W 16/32; H04W 16/08; H04W 16/24; H04W 16/30; H04W 52/343; H04W 16/00; H04W 52/283; H04W 64/00; H04W 88/08; H04W 88/085; H04W 16/18; H04W 24/00; H04W 36/30; H04W 88/06; H04W 28/0289; H04B 7/0491; H04B 7/2606; H04B 7/2609; H01Q 1/246

See application file for complete search history.

(56) References Cited

U.S. PATENT DOCUMENTS

| 4,144,411 | A | * | 3/1979 | Frenkiel | 455/447 |
|---|---|---|---|---|---|
| 5,504,938 | A | * | 4/1996 | Redden | 455/436 |
| 6,363,261 | B1 | * | 3/2002 | Raghavan | 455/561 |
| 6,633,559 | B1 | * | 10/2003 | Asokan et al. | 370/350 |
| 7,072,663 | B2 | * | 7/2006 | Ramos et al. | 455/453 |
| 7,103,361 | B2 | * | 9/2006 | Gustafsson | 455/446 |
| 7,920,870 | B1 | * | 4/2011 | Bhatia et al. | 455/444 |
| 2002/0021673 | A1 | | 2/2002 | Agin et al. | |
| 2004/0229621 | A1 | | 11/2004 | Misra | |
| 2006/0182067 | A1 | | 8/2006 | Rinne et al. | |
| 2007/0184869 | A1 | | 8/2007 | Koo et al. | |

FOREIGN PATENT DOCUMENTS

| EP | 1292164 | 3/2003 |
|---|---|---|
| GB | 2311191 | 9/1997 |
| GB | 2 448 194 A | 10/2008 |
| WO | WO 2008/150206 | 12/2008 |
| WO | WO 2009/061239 | 5/2009 |

OTHER PUBLICATIONS

Application No. 200930580, Mail Date Jun. 10, 2011, Spanish Search Report.
European Search Report for EP 10 17 2252 dated May 28, 2014.

* cited by examiner

*Primary Examiner* — Nay A Maung
*Assistant Examiner* — Alejandro Rivero
(74) *Attorney, Agent, or Firm* — Workman Nydegger

(57) ABSTRACT

Method and system for dynamically selecting a cell range of a base station connected to User Equipments, according to the distances between each of the User Equipments and the base station, and the percentage of a maximum baseband capacity of the base station used by connections with the User Equipments.

12 Claims, 2 Drawing Sheets

CELL RANGE SELECTION BASED ON UE DISTANCE AND BASE STATION CAPACITY

CROSS-REFERENCES AND RELATED APPLICATIONS

This application claims the benefit of the Spanish Patent Application No. ES P200930580, filed on Aug. 7, 2009, which is hereby incorporated by reference in its entirety.

FIELD

Embodiments of the present invention are directed to the telecommunications sector and, especially, to the industrial area engaged in providing Radio Access Networks (RANs) with elements of cellular infrastructures such as Base Station Controllers (BSCs) and Base Stations (Nodes B) for wireless communications systems.

More specifically, embodiments relate to cell range selection in such networks.

BACKGROUND

In wireless networks, the range of a cell (i.e. the distance below which a base station is capable of connecting and providing services to a User Equipment (UE)) depends on the length of a window in which the base station is configured to wait for RACH (Random Access CHannel) messages. This means that, for a fixed length of this window, only UEs within a certain distance from the base station can establish a connection with the base station, while UEs which are further than said distance cannot be serviced by the base station, even if the physical conditions (e.g. received signal power) would allow said service.

The coverage of a cell is thus vendor implementation dependant, and it can, in most cases, be manually switched between two ranges, corresponding to two operation modes:

Normal Cell Range, with typical values of 30 to 40 kilometers.

Extended Cell Range, which allows the base station to serve UEs within the maximum possible range (typically, up to 100 Km). In this case, propagation becomes a limiting factor, thus requiring very good propagation conditions to being able to provide service up to that maximum range. Typical scenarios in which propagation conditions may allow to fully exploit the Extended Cell Range include flat terrains and the sea, usually with a low density of UEs.

Nevertheless, even in scenarios in which the Extended Cell Range can be activated without being affected by problems in the propagation conditions, Extended Cell Range presents a major drawback, that is, its baseband capacity consumption is much higher than the baseband capacity consumption of the Normal Cell Range (typically 2 or 3 times higher).

For this reason, using the Extended Cell Range as a fixed configuration, ignoring the situation of the scenario at a given instant, can result in a waste of resources, while limiting the base station to the Normal Cell Range can leave without service UEs within the maximum range of the base station, even in conditions of low baseband capacity consumption.

SUMMARY

Embodiments of the present invention are directed to systems and methods for dynamically selecting a cell range of a base station.

Disclosed embodiments include methods that dynamically switch between two operation modes of a base station in a mobile network (e.g. in a WCDMA Network, a Node B), the two operation modes corresponding to two different cell ranges, according to distances to the base station of UEs being served by the base station, and to the baseband capacity of the base station consumed by connections with said UEs. A balance between the coverage of the base station and its baseband consumption is thus obtained, being adapted to the current situation of the scenario at a given instant.

In a disclosed embodiment, the base station to which the method is applied is capable of operating at least using two different operation modes:

a first operation mode using which the base station is capable of serving UEs within a first cell range;

a second operation mode using which the base station is capable of serving User Equipments within a second cell range which is wider than the first cell range. Using this second operation mode, a higher range is achieved, being able to serve UEs whose distance to the base station is higher than in the first operation mode, usually having the drawback of a higher base band capacity consumption at the base station.

To select the most appropriate operation mode at each instant, the method monitors both the distance of each UE to the base station and the base band capacity consumed by the UEs and combines this information to switch to the first or second operation mode according to the following steps:

Measuring the distances between the base station and each of the UEs which are being served the base station, that is, the UEs which are within the cell range of the base station. These distances are preferably measured by means of Round Trip delay Time (RTT) measurements, which measures the distance between the base station and a UE according to an amount of time required to send a signal from the base station to an UE and back from the UE to the base station.

Measuring the total percentage of the maximum base band capacity of the base station used by connections with the UEs, that is, the sum of the base band capacity consumption of the connections with each UE being served by the base station divided by the maximum base band capacity of the base station.

If the base station is operating using the first operation mode, the method switches the base station to the second operation mode when any or both of the following conditions is met:

The distance from at least a UE to the base station is higher than the first cell range minus a predefined offset distance, which means that a user is close to the border of the area in which the base station can provide service and the cell range is thus to be increased.

The total percentage of the maximum baseband capacity of the base station used by the connections with the User Equipments is lower than a predefined threshold plus a predefined hysteresis margin. With this latter condition, the wider cell range (second operation mode) is selected whenever the current traffic load is low enough as to being handled by the base station even with the increase of base band consumption implied by the second operation mode.

If the base station is operating using the second operation mode, the base station switches back to the first operation mode when both the following conditions are simultaneously met:

The total percentage of the maximum baseband capacity of the base station used by the connections with the User Equipments is higher than a predefined threshold, which means that the UEs are using most or all of the available resources and the service would benefit from switching to the first operation mode.

The distance from each of the UE to the base station is lower than the first cell range minus the predefined offset distance, which means that all of the users are positioned within the first cell range and by switching to the first operation mode, no UE which is being served is left without service.

In a disclosed embodiment, the method can either be fully implemented by the base station, or divided between the base station an a Base Station Controller (e.g. in a WCDMA Network, a Radio Network Controller), the latter being in charge of making the decisions of when to switch the operation mode of the base station according to the described method.

In another disclosed example embodiment a system to perform the described method is disclosed. The system comprises, for example:

- measuring means in the base station configured to measure the distances between the base station and each of the UEs (preferably measured by means of RTT measurements) and the total percentage of the maximum base band capacity of the base station used by connections with the UEs.
- switching means configured to switch the operation mode of the base station according to the conditions described for the method of the invention.

There are two disclosed options for the exemplary system:

- Full implementation in the base station, that is, not only the measuring means but also the switching means are fully implemented in the base station. This option has the advantage of not needing any message exchange with a Base Station Controller and an immediate update of the measurements performed by the Base Station in order to determine if the operation mode is to be switched.
- The decisions on when to switch the operation mode of the base station are made by a Base Station Controller. In order to do that, the system further comprises transmission means in the base station configured to report to a Base Station Controller the measured distances and total percentage of the maximum baseband capacity of the base station used by the connections with the User Equipments; and requesting means at the Base Station Controller (as part of the switching means) configured to send requests to the Base Station to switch the base station operation mode whenever determined by the described conditions of the method. The latter option, although more resource-consuming, takes advantage of the Base Station Controller, which typically has more memory to store the measurements of the base station.

One advantage of the disclosed embodiments is that it allows a base station to provide service to the widest possible area (thus optimizing the coverage and number of serviced users), while saving baseband capacity whenever possible (thus improving the service offered to the users).

BRIEF DESCRIPTION OF THE DRAWINGS

For the purpose of aiding to better understand the characteristics of the invention according to a preferred practical embodiment thereof and in order to complement this description, the following figure is attached as an integral part thereof, having an illustrative and non-limiting character.

DETAILED DESCRIPTION OF EXAMPLE EMBODIMENTS

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

The method and system hereby described can be applied, for example, to WCDMA (Wideband Code Division Multiple Access) networks, in which Base Stations are called Nodes B and Base Station Controllers are called RNC (Radio Network Controller); LTE (Long Term Evolution) networks, in which Base Stations are called eNodes B; and GSM mobile networks wherein Base Stations are called BTS (Base Transceiver Station). Thus, in the rest of the document, the terms base station and base station controller are considered to also include the aforementioned terminologies.

Figure 1:
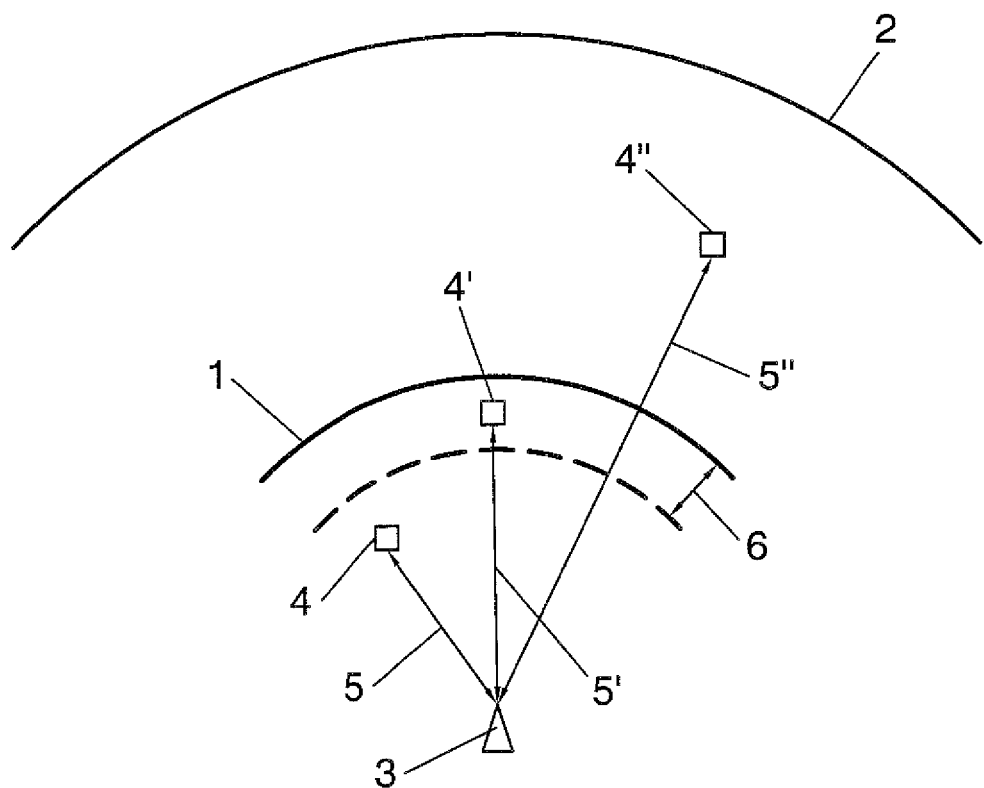
FIG. 1 shows an illustrative scheme of the main elements and distances involved in the method of the invention.
Figure 2:
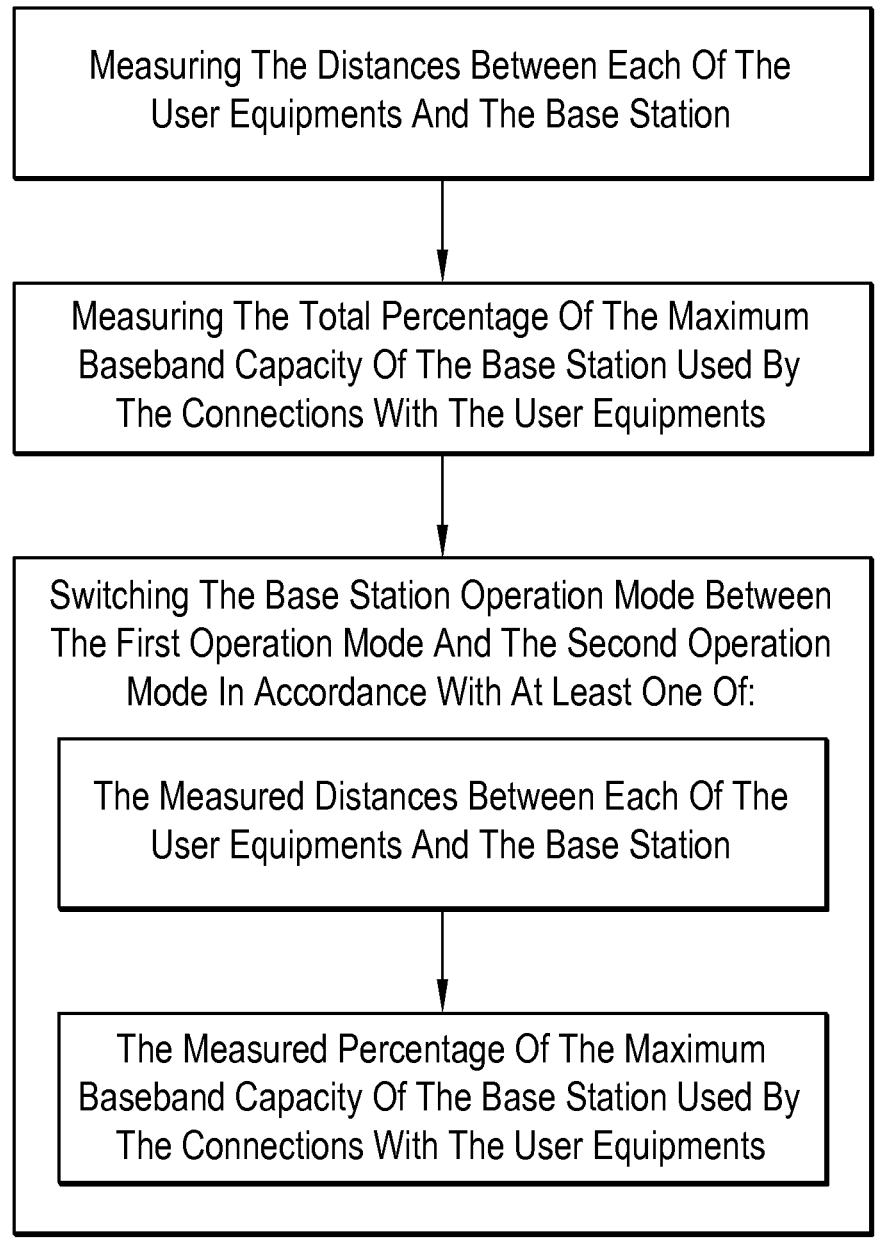
FIG. 2 illustrates a flow chart of the method steps of the embodiments disclosed herein.

FIG. 1 shows a base station 3 whose coverage can reach up to a normal cell range 1 or to an extended cell range 2, depending on whether the base station is using a first operation mode (from now on called normal mode) or a second operation mode (from now on called extended mode) respectively.

Each cell range is defined by a distance, meaning that every user equipment whose distance to the base station is below that range can be serviced by the base station. In the example of FIG. 1, if the base station is operating using the normal mode, only User Equipments 4 and 4', whose distances to the base station 5 and 5' are within the normal cell range 1 can be serviced. If the base station is operating using the extended mode, not only User Equipments 4 and 4', but also User Equipment 4", whose distance to the base station 5" is greater than the normal cell range 1 but is lower than the extended cell range 2, can be serviced.

As described in the background of the invention, the actual values of these cell ranges vary from one vendor to another, usually ranging from 30 to 40 km for the Normal Cell Range, and up to 100 km for the Extended Cell Range.

Offset distance 6 allows to define a region close to the limit of the Normal Cell Range, being this region used to detect users which can potentially leave the are covered by the normal mode. The reason behind the definition of this offset distance is that, in most cases, the base station can only determine the distance of the users within its current cell range, so if the base station is operating using the normal cell range, and there is a user equipment 4" outside this normal cell range, the base station is not able to detect this user equipment 4" and does not consider it for the selection of the cell range, thus leaving the user equipment 4" without service.

In order to select the cell range of the base station, the method monitors the following:

Percentage of the maximum baseband capacity of the base station 3 used by the UEs (i.e. the total amount used by all the connections established between the base station and the users).

Distances between each of the user equipments and the base station. There are different methods which are capable of providing this distance information, such as RTT, OTDOA (Observed Time Difference of Arrival) or GPS (Global Positioning System), all of which can be used to implement the present invention.

Moreover, as the method does only require the distance between the UEs and the base station, RTT is the preferred method to obtain this information. RTT information is easily obtained because it is needed to setup the radio link.

On the contrary, GPS information is not so easily obtained as the UE must not only have a GPS chipset but also explicitly give permission from the customer to be localised. Also, OTDOA requires additional hardware and software to be installed in the base stations.

When a cell is initially set up, Extended mode is preferred as a default option in order to being able to detect the maximum number of UEs.

Then, if the total percentage of the maximum baseband capacity used by the UEs exceeds a predefined threshold, and all the users are within the Normal Cell Range minus the offset distance, the base station switches to Normal Mode to provide higher bandwidth without leaving any UE without service.

If the base station is using the Normal Mode, and a UE approaches the limit of the Normal Cell Range, that is, the distance between a user and the base station is higher than the Normal Cell Range minus the offset distance, the base station is switched to the Extended Mode to make sure that the service provided to that UE is not interrupted if the UE leaves the area covered by the normal range.

In addition to the latter condition, if the total percentage of the maximum baseband capacity used by the UEs is below the threshold minus any hysteresis margin, the base station also switches to Extended Cell Range in order to have the maximum coverage when the used baseband capacity is not a limiting factor.

The described method can be fully implemented in the base station, as it is capable of obtaining all the monitored information (used baseband capacity and distance to each UE) and of switching the operation modes.

Alternatively, the base station can be configured to report this monitored information to a Base Station Controller, which sends a request to the base station when the operation mode is to be switched. To reduce the bandwidth used by this reporting, the base station can be configured to send only relevant information, that is, reporting only the events that can cause an operation mode switch, such as the instant in which the total percentage of the maximum baseband capacity of the base station used by the connections exceeds the predefined threshold or goes below the predefined threshold plus the predefined hysteresis margin.

The invention claimed is:

1. A method for dynamically selecting a cell range of a base station connected to User Equipments (UEs) in a mobile network, each UE being at a distance from the base station and each connection between the base station and the UEs using a percentage of a maximum baseband capacity of the base station, wherein the base station is configured to operate using a normal operation mode in which the base station serves UEs within a non-extended cell range and an extended operation mode in which the base station serves UEs within an extended cell range which is greater than the non-extended cell range, the non-extended and extended cell ranges being dependent on a length of a window of time that the base station is configured to wait for Random Access Channel (RACH) messages from the UEs, the method comprising:
(i) measuring the distances between each UE and the base station;
(ii) determining a total percentage of the maximum baseband capacity of the base station used by the connections with the UEs;
(iii) switching the base station operation mode from the normal operation mode to the extended operation mode when either or both of the following conditions is/are met:
the distance between at least one of the UEs and the base station is greater than the non-extended cell range minus a predefined offset distance; and
the total percentage of the maximum baseband capacity of the base station used by the connections with the UEs is less than a predefined threshold value plus a predefined hysteresis margin; and
(iv) switching the base station operation mode from the extended operation mode to the normal operation mode only when both of the following conditions are met:
all of the distances between each of the UEs and the base station are less than the non-extended cell range minus the predefined offset distance; and
the total percentage of the maximum baseband capacity of the base station used by the connections with the UEs is greater than the predefined threshold value, such that the base station remains in the extended operation mode covering the extended cell range that is dependent on the length of the window of time that the base station is configured to wait for Random Access Channel (RACH) messages from the UEs, even when all of the UEs are located within the non-extended range, unless the total percentage of the maximum baseband capacity of the base station used by the connections with the UEs is greater than the predefined threshold value.

2. The method according to claim 1, wherein the step of measuring the distance between each UE and the base station is performed by the base station by means of Round Trip delay Time measurements.

3. The method according to claim 1, wherein each of steps (i) to (iv) are performed by the base station.

4. The method according to claim 1, further comprising:
reporting via the base station to a base station controller the distances between the UEs and the base station and the total percentage of the maximum baseband capacity of the base station used by the connections with the UEs; and
wherein steps (i) and (ii) are performed by the base station and steps (iii) and (iv) are initiated by the base station controller by means of requests sent from the base station controller to the base station.

5. The method according to claim 1, further comprising, before step (i), causing the base station to initially default to the extended operation mode regardless of the position of any of the UEs.

6. The method according to claim 5, wherein steps (ii) to (iv) are performed on a periodic basis.

7. A system comprising:
a plurality of User Equipments (UEs);
a base station connected to the UEs, each UE being at a distance from the base station and each connection between the base station and the UEs using a percentage of a maximum baseband capacity of the base station, the base station having:
- a normal operation mode in which the base station is configured to serve the UEs when the UEs are within a non-extended cell range; and
- an extended operation mode in which the base station is configured to serve the UEs when the UEs are within an extended cell range which is greater than the non-extended cell range, the non-extended and extended cell ranges being dependent on a length of a window of time that the base station is configured to wait for Random Access Channel (RACH) messages from the UEs;

means for measuring the distance between each UE and the base station;
means for determining a total percentage of the maximum baseband capacity of the base station used by connections with the UEs being served by the base station;
means for switching the base station operation mode from the normal operation mode to the extended operation mode when either or both of the following conditions is/are met:
- the distance between at least one of the UEs and the base station is greater than the non-extended cell range minus a predefined offset distance; and
- the total percentage of the maximum baseband capacity of the base station used by the connections with the UEs is less than a predefined threshold value plus a predefined hysteresis margin; and means for switching the base station operation mode from the extended operation mode to the normal operation mode only when both of the following conditions are met:
- all of the distances between each of the UEs and the base station are less than the non-extended cell range minus the predefined offset distance; and
- the total percentage of the maximum baseband capacity of the base station used by the connections with the UEs is greater than the predefined threshold value, such that the base station remains in the extended operation mode covering the extended cell range that is dependent on the length of the window of time that the base station is configured to wait for Random Access Channel (RACH) messages from the UEs, even when all of the UEs are located within the non-extended range, unless the total percentage of the maximum baseband capacity of the base station used by the connections with the UEs is greater than the predefined threshold value.

8. The system according to claim 7 wherein the means for measuring the distance between each UE and the base station is configured to measure using Round Trip delay Time measurements.

9. The system according to claim 7 wherein the means for switching the base station operation mode from the normal operation mode to the extended operation mode and the means for switching the base station operation mode from the extended operation mode to the normal operation mode are incorporated within the base station.

10. The system according to claim 7 further comprising:
a base station controller;
means for transmitting a report from the base station to the base station controller, the report comprising the distances between the UEs and the base station and the total percentage of the maximum baseband capacity of the base station used by the connections with the UEs; and
means for sending requests from the base station controller to the base station to switch the base station operation mode.

11. The system according to claim 7, wherein the base station further comprises means for causing the base station to initially default to the extended operation mode regardless of the position of any of the UEs.

12. A base station configured to serve a plurality of User Equipments (UEs); each UE being at a distance from the base station and each connection between the base station and the UEs using a percentage of a maximum baseband capacity of the base station, the base station having a normal operation mode in which the base station is configured to serve the UEs when the UEs are within a non-extended cell range and an extended operation mode in which the base station is configured to serve the UEs when the UEs are within an extended cell range which is greater than the non-extended cell range, the non-extended and extended cell ranges being dependent on a length of a window of time that the base station is configured to wait for Random Access Channel (RACH) messages from the UEs the base station comprising:
means for measuring the distance between each UE and the base station;
means for determining a total percentage of the maximum baseband capacity of the base station used by connections with the UEs being served by the base station;
means for switching the base station operation mode from the normal operation mode to the extended operation mode when either or both of the following conditions is/are met:
- the distance between at least one of the UEs and the base station is greater than the non-extended cell range minus a predefined offset distance; and
- the total percentage of the maximum baseband capacity of the base station used by the connections with the UEs is less than a predefined threshold value plus a predefined hysteresis margin; and means for switching the base station operation mode from the extended operation mode to the normal operation mode only when both of the following conditions are met:
- all of the distances between the UEs and the base station are less than the non-extended cell range minus the predefined offset distance; and
- the total percentage of the maximum baseband capacity of the base station used by the connections with the UEs is greater than the predefined threshold value, such that the base station remains in the extended operation mode covering the extended cell range that is dependent on the length of the window of time that the base station is configured to wait for Random Access Channel (RACH) messages from the UEs, even when all of the UEs are located within the non-extended range, unless the total percentage of the maximum baseband capacity of the base station used by the connections with the UEs is greater than the predefined threshold value.

* * * * *